Figure 10:
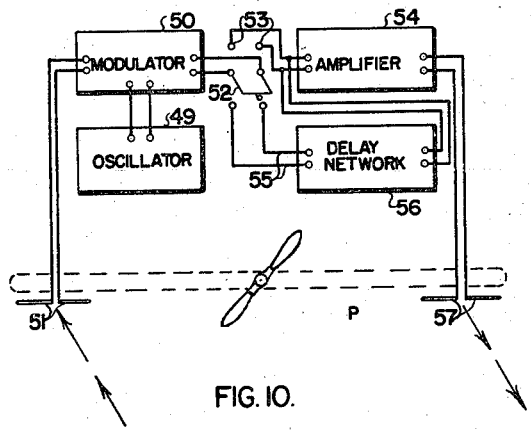

Sept. 3, 1946.        H. M. LEWIS        2,406,953
SYSTEM FOR DETERMINING THE POSITION OF AN OBJECT IN SPACE
Filed Aug. 21, 1941        6 Sheets-Sheet 1
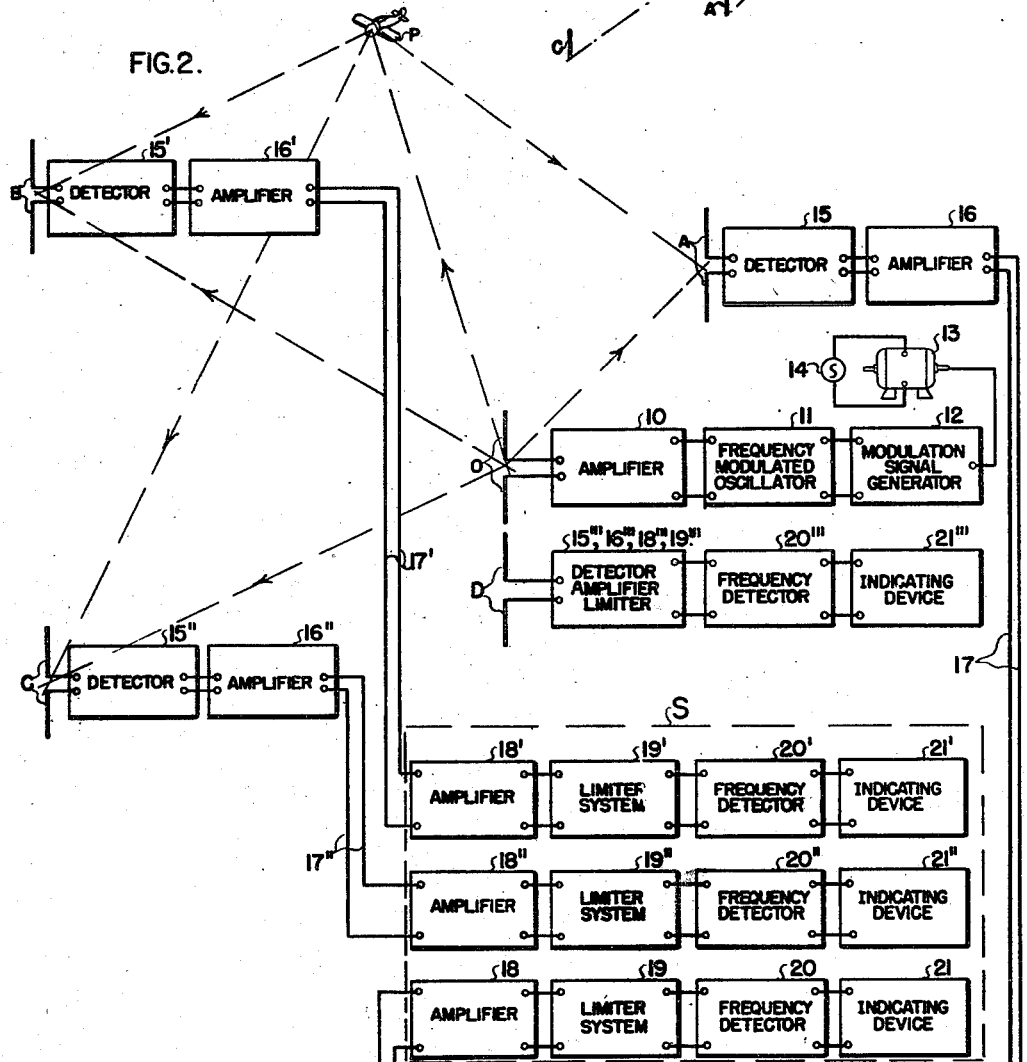
INVENTOR
HAROLD M. LEWIS.
BY
ATTORNEY

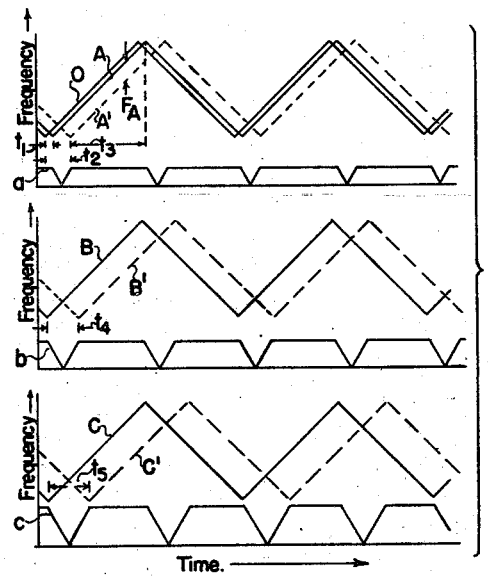
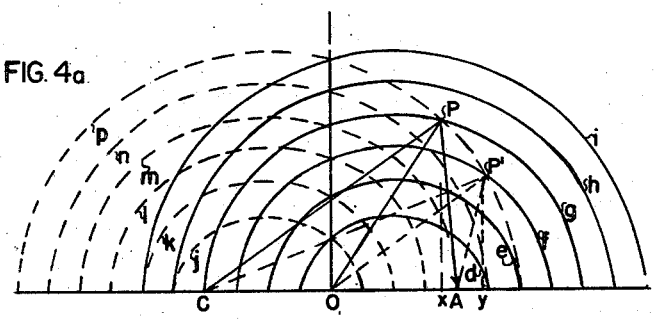
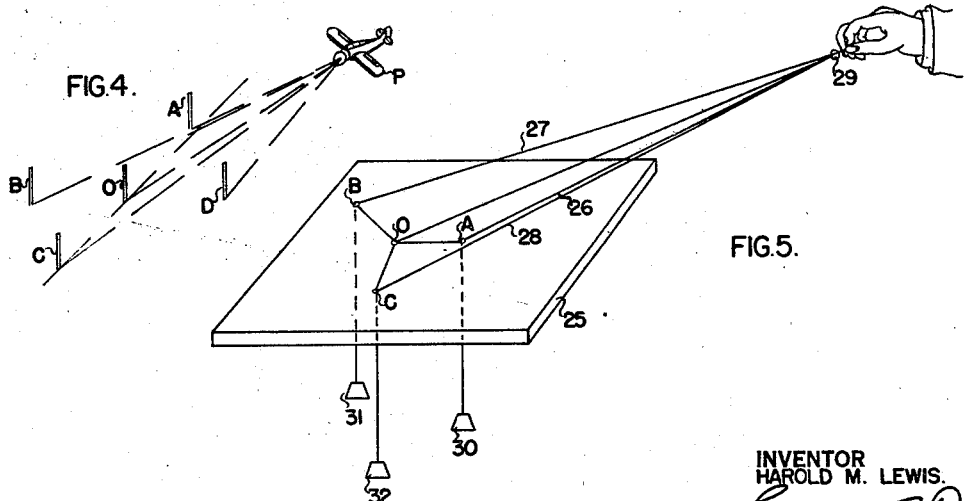

Sept. 3, 1946.  H. M. LEWIS  2,406,953

SYSTEM FOR DETERMINING THE POSITION OF AN OBJECT IN SPACE

Filed Aug. 21, 1941  6 Sheets-Sheet 3

INVENTOR
HAROLD M. LEWIS.
BY
ATTORNEY

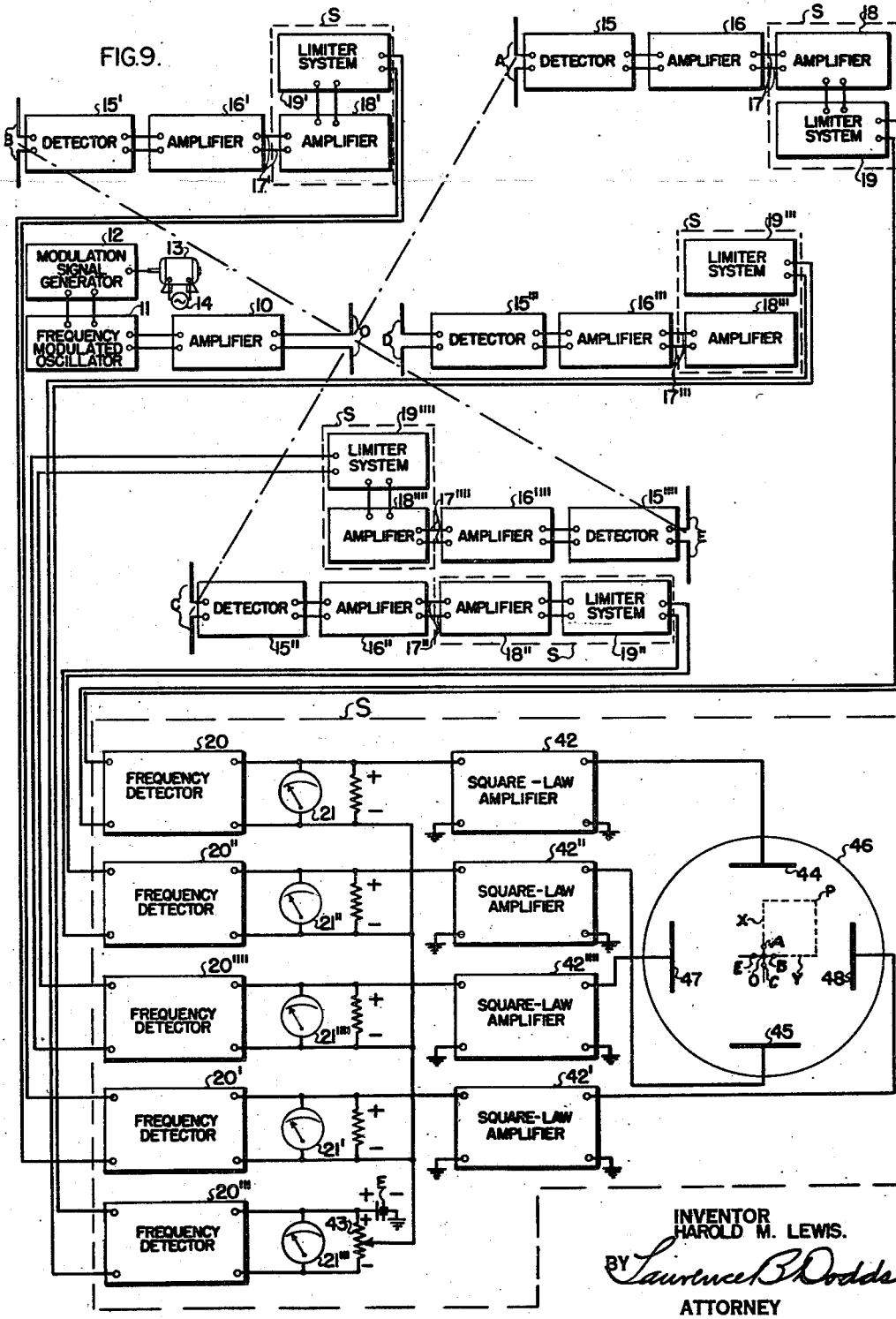

Sept. 3, 1946.  H. M. LEWIS  2,406,953
SYSTEM FOR DETERMINING THE POSITION OF AN OBJECT IN SPACE
Filed Aug. 21, 1941  6 Sheets-Sheet 5

INVENTOR
HAROLD M. LEWIS.
BY *Laurence B. Dodds*
ATTORNEY

Sept. 3, 1946.          H. M. LEWIS                2,406,953
       SYSTEM FOR DETERMINING THE POSITION OF AN OBJECT IN SPACE
              Filed Aug. 21, 1941         6 Sheets-Sheet 6
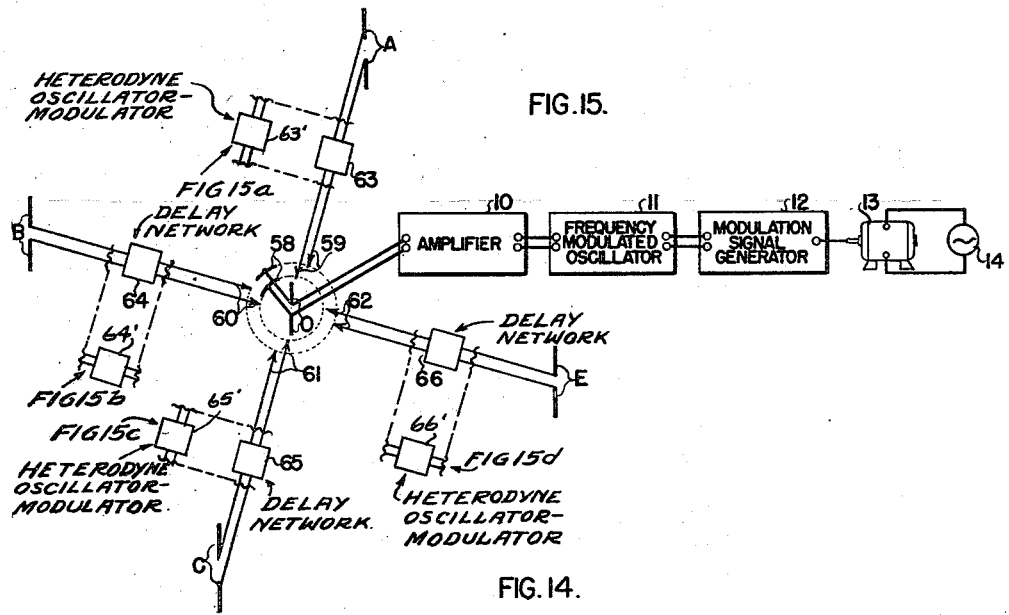
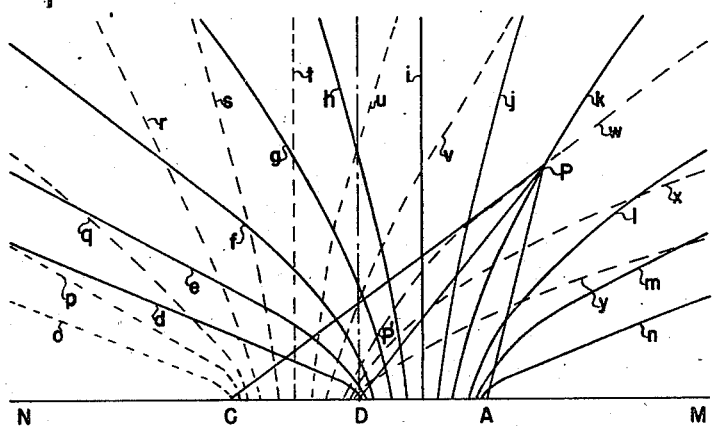
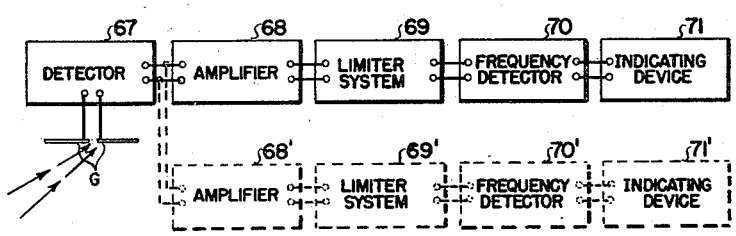
INVENTOR
HAROLD M. LEWIS.
BY Laurence B. Dodds
ATTORNEY Patented Sept. 3, 1946

2,406,953

UNITED STATES PATENT OFFICE 2,406,953

SYSTEM FOR DETERMINING THE POSITION OF AN OBJECT IN SPACE

Harold M. Lewis, Allenhurst, N. J., assignor, by mesne assignments, to Hazeltine Research, Inc., Chicago, Ill., a corporation of Illinois Application August 21, 1941, Serial No. 407,732

28 Claims. (Cl. 250—11)

The present invention relates to systems for determining the position of an object in space and, particularly, to systems of this type operating on the transmission of carrier-wave energy between the object and one or more predetermined reference points displaced therefrom. While the position-determining systems of the invention are of general application, they are particularly suitable for determining the position in space of aircraft in flight and will be described in that connection.

A need has long existed for a relatively simple and accurate system by which the position in space of aircraft in flight might be easily and quickly determined. This information is of great importance in military operations where it is essential that the exact position of enemy aircraft be quickly determined or that a ground commander know the exact location of his own aircraft in flight in order most efficiently and effectively to direct their operation. In commercial flying, also, it is sometimes desirable that the pilot of an aircraft in flight be able to determine his exact position in space when flying "blind" or under adverse flying conditions or when over unfamiliar territory, since this information will enable him most efficiently and safely to navigate the aircraft to his destination. The information which the pilot desires may be determined from ground stations and transmitted to the pilot by radio, or the pilot may himself determine his position with respect to fixed beacon stations on the ground. In either event, it is desirable that the essential equipment carried by the airplane for this purpose shall involve no unnecessary duplication of other carrier-signal apparatus conventionally provided for communication between the airplane and ground stations.

Any determination of the position of aircraft in space must provide information not only of the azimuth of the aircraft from a fixed point on the ground but also of the distance of the aircraft from the ground point and should include information giving the altitude of the aircraft. From such information, the flight of the aircraft may be visually indicated continuously by suitable indicating devices or its flight may be followed by the method of determining the position of the airplane at desired intervals.

It is also frequently desirable that aircraft be automatically navigated along a predetermined course by apparatus which controls the flight of the aircraft in accordance with carrier signals transmitted to the aircraft from ground beacon stations.

It is an object of the present invention, therefore, to provide a new and improved system for determining the position of an object in space having great flexibility and a high degree of accuracy and reliability in operation.

It is a further object of the invention to provide a system of the type described which is particularly suitable for locating the azimuth, altitude and distance of aircraft in flight with reference to a fixed point on the ground.

It is an additional object of the invention to provide a system particularly suitable for determining the position in space of aircraft during flight which is readily adapted to such determination either from the aircraft or from a point on the ground or simultaneously from both.

It is a further object of the invention to provide an improved system for determining the position of an object in space and one which does not require the use at the locating station of elements which must be moved or directed toward the object.

In accordance with the invention, a system for determining the position in space of an object comprises a plurality of related antennas having space displacements with respect to each other and to the object, the antennas forming at least three pairs. The system includes a source of high-frequency carrier waves, means for generating a modulation signal for periodically varying a characteristic of the carrier waves, and means including the antennas for translating the modulation signal over paths corresponding to each of the aforesaid space displacements. There is provided means responsive to signals translated over the aforesaid paths to derive for each of the pairs of antennas a control signal having a characteristic which is dependent upon the relative space displacements of the object from individual ones of the antennas. Each of the pairs of antennas has the characteristic that its equal-valued control signal loci are represented by geometric surfaces of revolution, the position in space of the object defining the point of intersection of surfaces of revolution of at least three of the pairs of antennas. The system includes means for utilizing the aforesaid control signals to determine the aforesaid point of intersection, thereby to determine the position in space of the object.

In accordance with a preferred form of the invention, in a system of the type described, the means for generating a modulation signal for periodically varying a characteristic of the carrier waves comprises means for periodically deviating the frequency of the carrier waves at a substantially constant rate over a predetermined range of frequency deviation.

For a better understanding of the present invention, together with other and further objects thereof, reference is had to the following description taken in connection with the accompanying drawings, and its scope will be pointed out in the appended claims.

Figure 12:
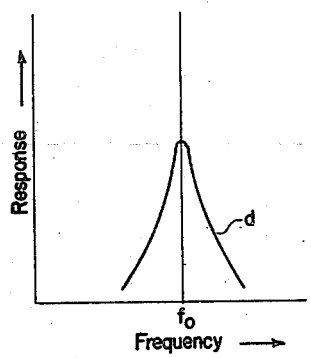
Figure 11:
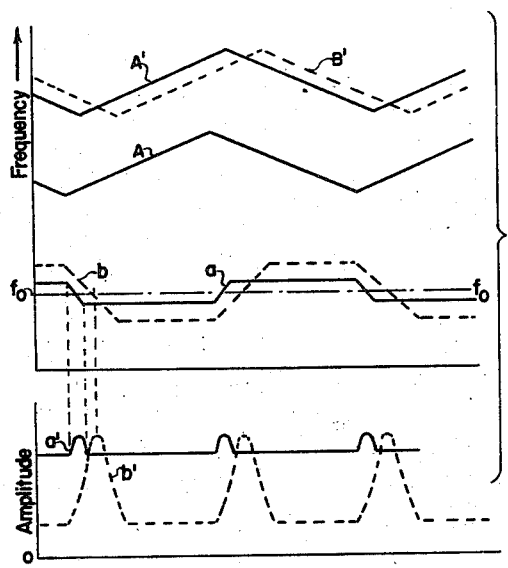
Figure 8:
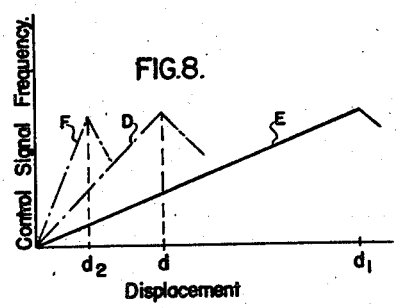
Figure 13:
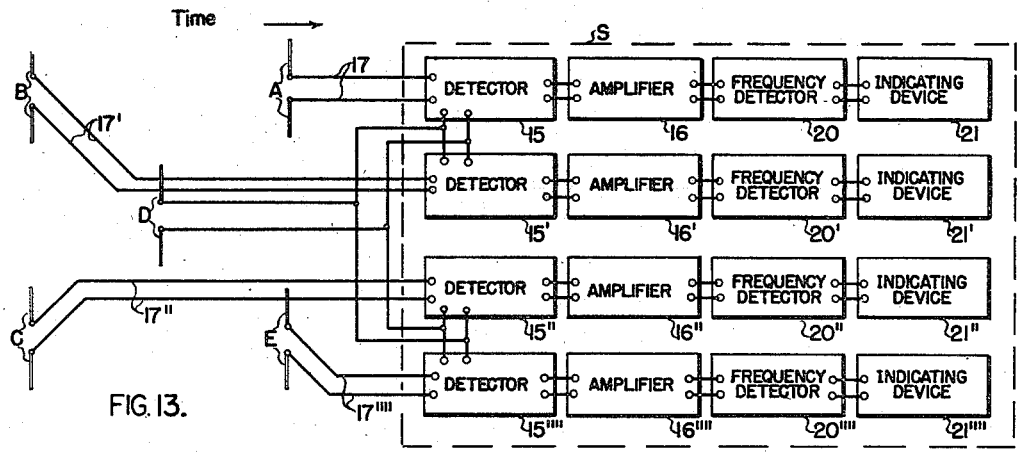
Figure 17:
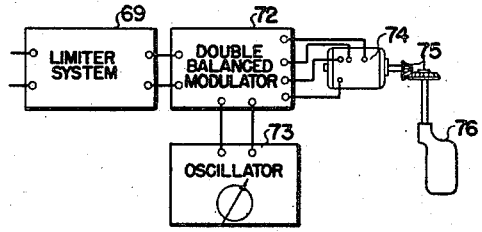
Figure 18:
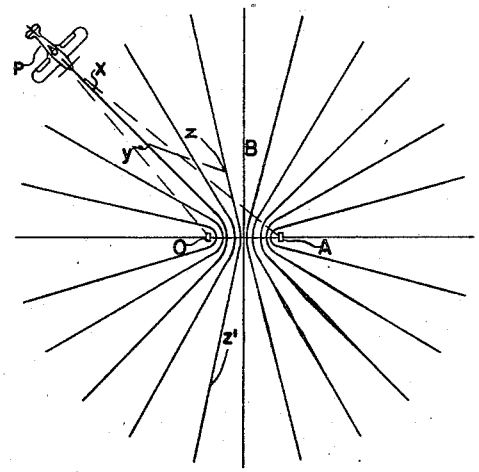
Figure 19:
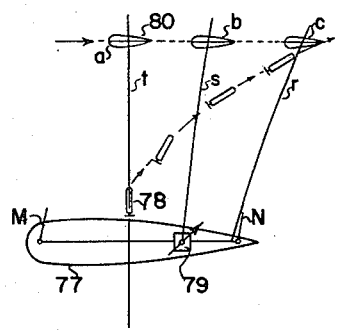

Referring now to the drawings, Fig. 1 illustrates the general arrangement of a system of antennas suitable for a position-determining system embodying the invention; Fig. 2 is a circuit diagram, partly schematic, of a complete system for determining the position of an object in space and represents a particular embodiment of the invention; Fig. 3 is a graph used in explaining the operation of the Fig. 2 embodiment of the invention; Fig. 4 illustrates a slightly different antenna arrangement; Fig. 4a is a graph which may be used with the antenna arrangement of Fig. 4 graphically to determine the position in space of an object from the indications provided by the indicating devices included in the system of Fig. 2; Fig. 5 illustrates a plotting board suitable for use in analyzing the indications provided by the system of Fig. 2 to determine the position of the object in space; Figs. 6 and 7 represent detailed constructions of modified forms of a portion of the plotting board of Fig. 5; Fig. 8 is a curve used in explaining the operation of the system illustrated in Fig. 2; Fig. 9 is a circuit diagram, partly schematic, of a complete position-determining system embodying the invention and represents a modified form thereof; Fig. 10 represents a modified form of a portion of either the Fig. 2 or Fig. 9 arrangements; Figs. 11 and 12 are curves used in explaining the operation of a system embodying the Fig. 10 modification of the invention; Fig. 13 represents an additional modified form of the invention which is essentially similar to the arrangements of Figs 2 and 9; Fig. 14 is a graph used as an aid in explaining the operation of the Fig. 13 modification; Figs. 15, 15a–15d, inclusive, 16 and 17 represent an embodiment of the invention wherein the position of the object in space may be determined from the object itself with reference to a fixed point and may be navigated along a prescribed desired course with respect to the fixed point; Fig. 18 is a graph used in explaining the operation of the Fig. 17 arrangement; and Fig. 19 represents an arrangement suitable for controlling from a fixed point in space the movement of an object through space.

Referring particularly to Fig. 1, there is shown a general arrangement of antennas A, B, C and O, preferably of the vertical or other nondirectional type, suitable for use in a system for determining the position in space of a navigable object, for example, an airplane P, in accordance with the invention. The antennas A, B and C, in this general arrangement, are spaced at predetermined distances from the central antenna O and at predetermined distances from each other. The antennas thus have predetermined space displacements with respect to each other and to the airplane P. In the arrangement hereinafter to be described, the central antenna O cooperates with each of the satellite antennas A, B and C to form three pairs of antennas, O, A, O, B, and O, C. In general, a high-frequency carrier wave is frequency-modulated in accordance with a saw-tooth modulation signal and is transmitted from one or more of the antennas O, A, B and C to the airplane, or from the airplane to the antennas, or from one of the antennas to the airplane where the carrier wave is reflected or reradiated back to the remaining antennas. The carrier waves translated by the pairs of antennas O, A, O, B, and O, C over paths corresponding to the space displacements between the antennas of each pair and between the antennas and the airplane have frequency differences due to the several space displacements, as will be pointed out in greater detail hereinafter, and may thus be combined to derive for each pair of antennas a control signal having a characteristic, for example, a beat-frequency characteristic, which is dependent upon the relative space displacements of the airplane P from individual ones of the antennas O, A, B and C. Each of the pairs of antennas O, A, O, B and O, C has the characteristic that the equal-valued control-signal loci are represented by geometric surfaces of revolution of which the antennas of each pair are located at the foci thereof. The position in space of the airplane P defines the point of intersection of the surfaces of revolution representing the control-signal loci of the three pairs of antennas. Consequently, means may be provided either at one of the antennas O, A, B or C or at the airplane P for determining the point of intersection of the three surfaces of revolution individual to the three pairs of antennas, thereby to determine the position in space of the airplane P.

Fig. 2 is a circuit diagram, partly schematic, of a particular form of the invention in which a carrier wave is radiated from a point centrally located with respect to the antenna system to the airplane, the position of which in space is to be determined. Carrier-wave energy is reflected by the airplane back toward the antenna system and is received by each antenna of the system to derive a control signal, the three control signals indicating the position of the airplane in space. This arrangement is particularly suited for use in military operations to determine the position in space of hostile aircraft. The antennas O, A, B and C are here represented as of the vertical dipole type. In this arrangement, the antenna O is used as a radiator of carrier waves and is coupled to the output circuit of an amplifier 10. There is coupled to the input circuit of the amplifier 10 a source of high-frequency carrier waves comprising an oscillator 11 and means for generating a modulation signal for periodically varying a characteristic of the carrier waves of source 11, this means comprising a modulation-signal generator 12 coupled to a modulation circuit of oscillator 11 and operated by a synchronous motor 13 which is energized from an alternating current source 14. The modulation signal generated by unit 12 is substantially of linear saw-tooth wave form. In a preferred form of the invention, the modulation signal generated by unit 12 frequency-modulates the high-frequency oscillator 11 to develop in the output circuit of unit 11 a frequency-modulated carrier wave which, after amplification by the amplifier 10, is radiated by the antenna O, whereby the carrier wave radiated by antenna O to the airplane P periodically deviates in frequency at a substantially constant rate over a predetermined range of frequency deviation.

The carrier wave radiated to the airplane by the antenna O is reflected by the airplane to each of the antennas A, B and C. These antennas are individually coupled to the input circuits of a plurality of similar carrier-wave receivers. The receiver associated with antenna A will, therefore, be alone described and the same reference numerals, primed and double primed, respectively, will be used to designate corresponding components of the receivers associated with antennas B and C. The antenna A is coupled to the input circuit of a detector 15, the output circuit of which is coupled to an amplifier 16. The frequency-modulated carrier wave radiated by antenna O is either radiated directly to each of the antennas A, B and C, as indicated in the drawings by the broken line connecting antennas O, A, B and C, or is applied through a transmission line, not shown, from the output circuit of unit 10 to the input circuit of the detectors 15, 15' and 15'', the latter method being preferred since it avoids undesired spurious reflections of the carrier wave to the antennas A, B and C from objects in the neighborhood of the antenna system.

There is derived by the detector 15, in a manner presently to be considered in more detail, a control signal which is amplified by the amplifier 16 and transmitted over a transmission line 17 to a central coordinating station S where the value of the control signal may be measured and used in determining the position in space of the airplane P. The detectors 15, 15', etc., thus comprise means responsive to signals translated over paths corresponding to the space displacements of the antennas from each other and from the airplane P to derive for each of the pairs of antennas O, A, O, B and O, C a control signal having a characteristic which is dependent upon the relative space displacements of the airplane P from individual ones of the antennas. The apparatus provided at the central station S includes an amplifier 18 having an input circuit coupled to the transmission line 17 and having an output circuit coupled, in the order named, to a limiter system 19, a frequency detector 20, and an indicating device 21.

Considering now the operation of the system described above and referring to the curves of Fig. 3, the frequency-modulated carrier wave developed by the oscillator 11 and radiated by the antenna O has a frequency-deviation characteristic as represented by curve O. It is well known that high-frequency carrier waves travel through space, or through a physical transmission line, with a constant velocity which in space is substantially equal to that of light. Curve A thus represents the frequency characteristic of the carrier wave which is directly radiated from antenna O to antenna A, a time interval $t_1$ being necessary for the carrier wave to travel therebetween. The carrier wave which is radiated by antenna O to the airplane P and reflected therefrom to the antenna A necessarily travels over paths corresponding to the space displacements of the airplane P from the antennas O and A. Assuming that the latter path is considerably longer than that taken by the carrier wave in traveling directly between antennas O and A, a longer time interval $t_2$ elapses between the transmission of the carrier wave from antenna O and the reception by antenna A of the reflected wave represented by broken-line curve A'.

There are thus applied to the input circuit of detector 15 two carrier waves which differ in frequency during the interval $t_3$ by a constant difference frequency $F_A$. The detector 15 consequently derives a beat-frequency control signal from the two carrier waves applied to the input thereof which has the frequency-deviation characteristic represented by curve $a$. It will be evident that the average frequency of the control signal varies directly with the difference between the constant time interval $t_1$ and the time interval $t_2$, the latter varying with the space displacement of the airplane P from antennas O and A. This control signal is amplified by amplifier 16, is translated through the transmission line 17 to the control station, is further amplified by amplifier 18, limited to a substantially constant amplitude by the limiting system 19 and applied to the frequency detector 20. The frequency detector 20 derives a control potential varying in magnitude with the frequency of the control signal. This potential is applied to the indicating device 21, preferably a meter calibrated in units of space displacement, whereby the devices 21, 21', etc., are directly responsive to control potentials and indirectly responsive to the control signals to provide a visual indication representative of the position in space of the airplane P. Thus, the readings of the meters 21, 21', etc., directly indicate the relative distances of the airplane P from the respective antennas O and A, O and B, etc.

If it be further assumed that the airplane P has a displacement with respect to the antenna B greater than that with respect to the antenna A, and has an even greater displacement with respect to the antenna C, the reflected carrier wave, represented by broken-line curve B', is received by antenna B at a time interval $t_4$ after the carrier wave, represented by curve B, is received by direct radiation from antenna O. The beat-frequency control signal derived in the output of the detector 15' thus has the frequency-deviation characteristic represented by curve $b$. Similarly, the direct and reflected carrier waves, represented by the respective curves C and C', received by antenna C have a time interval displacement $t_5$ and produce in the output of detector 15'' a control signal having the frequency-deviation characteristic represented by curve $c$. The resultant indications provided by the indicating devices 21' and 21'' thus directly indicate the relative distances of the airplane P from the respective pairs of antennas O, B and O, C.

Essentially, the control signals derived in the output circuits of the detectors 15, 15' and 15'' are a measure of the relative phase displacements of the modulation signals which are translated by the antennas of each pair from the source of such signals, comprising the unit 12, over paths corresponding to the space displacements of the antennas of such pair from each other and from the airplane P. Thus, the oscillator 11, the amplifier 10, and the antennas O, A, B and C comprise means including the antennas for translating the modulation signal over paths corresponding to each of such space displacements, and the detectors 15, 15', etc., comprise means responsive to signals translated over such paths to derive for each pair of antennas a control signal having a characteristic which is dependent upon the phase of the saw-tooth wave forms of the modulation signals translated by the antennas of such pair and thus upon the relative space displacements of the airplane P from individual ones of the antennas. Consequently, while in the arrangement of Fig. 2 the modulation signal is translated over paths corresponding to both types of space displacements, that is, the space displacements of the antennas O, A, B and C from each other and from the airplane P, by use of a signal-translating medium comprising the carrier waves produced by oscillator 11, it will be evident that the modulation signal may be equally well translated over paths corresponding to one type of the space displacements, for example, the space displacements between the antennas of each pair, without using for the translation thereof the medium of carrier waves. In the latter event, the space displacement of the airplane P from the antennas O, A, B and C is determined as before by suitably measuring the relative phase displacements, for each pair of antennas, of the modulation signals translated both alone and by the use of the medium of carrier waves.

The azimuth and distance of the airplane P with respect to one of the antennas, for example, the antenna O, and its height may be determined in a number of ways from the indications provided by the indicating devices 21, 21' and 21''. As an introduction to an explanation of such methods, it may be helpful mathematically to analyze the operation of the Fig. 2 embodiment of the invention, especially with regard to the relationships which the indications provided by the indicating devices 21, 21' and 21'' have to the space displacements of the antennas from each other and from the airplane P.

It can be shown mathematically that:

$$F_A = \frac{A+p-r}{c} \cdot 2(F_{max} - F_{min}) F_m \quad (1)$$

where:

$F_A$=the instantaneous frequency difference between the direct and reflected carrier waves applied to the input circuit of detector 15,
$A$=the space displacement of the airplane P from the antenna A,
$p$=the space displacement of the airplane P from the antenna O,
$r$=the space displacement of the antenna A from the antenna O,
$F_{max}$=the maximum frequency of the carrier wave,
$F_{min}$=the minimum frequency of the carrier wave,
$F_m$=the frequency of the modulation signal developed by the unit 12, and
$c$=the velocity of propagation of the carrier wave $=3 \times 10^8$ meters per second.

Similar equations can be derived for the antennas B and C. Equation 1, and corresponding equations for antennas B and C, may be simplified into the following forms:

$$A+p = KF_A + K' \quad (2)$$
$$B+p = KF_B + K' \quad (3)$$
$$C+p = KF_C + K' \quad (4)$$

where:

$K$=a first arbitrary constant
$K'$=a second arbitrary constant, and
$F_A$, $F_B$, and $F_C$=the instantaneous frequency differences of the carrier waves applied to the input circuits of the respective detectors 15, 15', and 15''.

The maximum frequency of each of the beat-frequency control signals developed in the output circuits of the detectors 15, 15' and 15'' thus varies directly with the individual values of the respective quantities $F_A$, $F_B$ and $F_C$. The time constant circuits of the detectors 20, 20' and 20'' may be proportioned to have a long time constant, in which event the control potential derived by each detector and applied to the respective indicating device 21, 21' and 21'' varies with the maximum frequency of the individual control signals, or may be proportioned to have a shorter time constant, as for example, one only sufficiently long that the control potential derived by the detector varies with the average value of the individual control signals.

It will be evident from Equations 2, 3, and 4 that the amplitudes of the indications of the devices 21, 21', and 21'' thus vary directly in accordance with the relative space displacements of the airplane P from the respective pairs of antennas O, A, O, B, and O, C. These indications directly provide data from which the distance of the airplane P from each of the antennas O, A, B, and C may be calculated by the use of trigonometric functions. The calculations may be simplified by the provision in the arrangement of Fig. 2 of another antenna D positioned centrally of the antennas A, B, and C, in close proximity to the antenna O, and coupled to a carrier-wave receiver similar to those associated with antennas A, B, and C. Since there is no appreciable space displacement between the antennas O and D, the indications provided by the indicating device 21''' directly give the space displacement of the airplane P from each of the antennas O and D. This gives an additional known quantity which aids in the trigonometric calculation of the position of the airplane P in space.

A graphical method may also be used for determining the position in space of the airplane P by use of the indications of the several indicating devices. This method is relatively simple and furnishes the desired information in a much more rapid manner. When using this method, it is preferable that the several antennas of Fig. 2 be arranged in aligned pairs on the $x$ and $y$ axes of a rectangular system of Cartesian coordinates as illustrated in Fig. 4, the antenena D being spaced from the antenna O the same distance as the antennas A, B, and C. An inspection of Equations 2, 3, and 4 shows that for any given values assigned to $F_A$, $F_B$, and $F_C$, the equations define ellipsoids having the respective pairs of antennas O, A, O, B, and O, C at the foci thereof. A similar situation is applicable to the pair of antennas O, D. Thus, each of the pairs of antennas has the characteristic that its equal-valued control-signal loci are represented by elliptical surfaces of revolution.

Referring now to Fig. 4a, the solid-line confocal family of elliptical curves $d$-$i$, inclusive, represent the intersection in a horizontal plane of the elliptical surfaces of revolution characteristic of one pair of antennas, for example, the pair O, A, each curve corresponding to one value of frequency of the control signal derived by the detector associated with the given pair of antenenas or, correspondingly, one value of indication of a corresponding indicating device. Similarly, the broken-line confocal family of curves $j$-$p$, inclusive, represent the intersection in the horizontal plane of the elliptical surfaces of revolution characteristic of a pair of antennas aligned on the same axis with the first pair, for example, the pair O, C in the example assumed. The same system of curves may also be used for the aligned pairs of antennas O, B and O, D.

Assume, for example, that the readings of the indicating devices 21 and 21'' indicate that the airplane P is on the elliptical surface of revolution corresponding to curve $g$ for the pair of antennas O, A and on the surface of revolution corresponding to curve $p$ for the pair of antennas O, C. The intersection of curves $g$ and $p$ at the point P at once provides both the $x$-coordinate of the projected position of the airplane P on the ground and the actual distance O, P of the airplane P from the antenna O. The same system of curves is used for determining the $y$-coordinate from the indications of the indicating devices 21' and 21''' corresponding to the respective pairs of antennas O, B and O, D. Thus, assuming that curves $f$ and $p$ correspond to the readings of indicating devices 21' and 21''', the intersection of these curves at the point P' at once determines the $y$-coordinate of the projected position of the airplane on the ground. The angle of elevation $\theta$ of the airplane P above the ground considered with respect to the antenna O is given by the relation:

$$\cos \theta = \sqrt{\frac{x^2+y^2}{p}} \qquad (5)$$

where $p$ corresponds to the distance O, P. The elevation of the airplane above the earth is given by the relation:

$$z = p \sin \theta \qquad (6)$$

and the azimuth is given by the relation:

$$\tan \psi = \frac{y}{x} \qquad (6a)$$

Equations 5, 6 and 6a may be solved graphically, if desired, in well-known manner.

It will be noted in connection with the curves of Fig. 4a that, since the distance O, P to the line of intersection of elliptical surfaces of revolution corresponding to curves $g$ and $p$ must necessarily be the same as the distance O, P' to the line of intersection of the surfaces of revolution corresponding to curves $f$ and $p$, the point P' may also be determined by drawing an arc from the point P, with the point O as a center to its intersection with one of the curves $f$ or $p$. It is thus evident that antenna D, for example, may be dispensed with in the graphical method of determining the position of the airplane P. The use of the antenna D, and a corresponding curve $p$, therefore, merely serves as a check on the results obtained.

In addition to omitting the antenna D, as just suggested, the antenna C may be located in close proximity to the antenna O whereby the pair of antennas O, C directly determines the distance O, P of the airplane from the antenna O. In this event, the geometric surfaces of revolution characteristic of the pair of antennas O, C have the special form of spherical surfaces of revolution. As before, the intersection of a predetermined one of the spherical surfaces of revolution characteristic of the pair of antennas O, C with predetermined ones of the elliptical surfaces of revolution characteristic of the pairs of antenna O, A and O, B determines the position of the airplane P in space.

Thus, the units 16-21, inclusive, 16'-21', inclusive, etc., comprise means for utilizing the control signals derived by the respective detectors 15, 15', etc., to determine the point of intersection of surfaces of revolution of at least three pairs of antennas, the point of intersection defining the position in space of the airplane P.

The position in space of the airplane P may also be graphically determined by the plotting board of Fig. 5. In this arrangement, a rigid flat sheet of material such as a board 25 has the layout of the antennas O, A, B, and C of Fig. 2 drawn to scale thereon. A plurality of holes are formed in the plate 25 at the positions occupied by the several antennas A, B and C and three cords 26, 27, and 28 are fixed at the point O and pass through a ring 29 and back through holes A, B, and C, respectively, to respective weights 30, 31, and 32. Each cord is calibrated in units of distance in accordance with the scale chosen for the plotting board so that each cord becomes a measuring tape. In using the arrangement of Fig. 5, the ring 29 is pulled, for example by hand, as indicated, or by other suitable means, until the indicated distance A+$p$ on cord 26 equals that given by the indicating device 21 for the pair of antennas O, A. Similarly, cords 27 and 28 are pulled until the respective indicated distances B+$p$ and C+$p$ correspond to the respective indications of the devices 21' and 21'' corresponding to the respective pairs of antennas O, B and O, C. The cords 26, 27, and 28 are fixed in position in the respective holes A, B, and C after being thus set and are pulled taut by the ring 29. The distance $p$ of the airplane P from the antenna O can be read directly from any of the cords at their point of contact with the ring 29, the azimuth can be measured with a protractor by measurement of the projection on the surface of the board 25 of that portion of the cords lying between the point O and ring 29, and the elevation can be measured by the scaled height of the ring 29 above the surface of board 25.

Fig. 6 is a cross-sectional view of a pivoted telescoping arm which may be used with the arrangement of Fig. 5 to maintain the several cords 26, 27, and 28 taut instead of maintaining the cords taut by hand through the use of the ring 29. This arm comprises a pair of telescopic cylinders 33, 34 which are biased apart by a helical spring 35. One of the telescopic cylinders, for example, cylinder 33, has a spherical head 36 formed on one end thereof, this head fitting in a suitable socket provided on the board 25 to form a ball and socket connection. One end of each of the cords 26, 27, and 28 is secured at the center O of the spherical head 36. In using the telescopic arm arrangement thus provided, the spring 35 causes the telescoping arms 33 and 34 to extend as far as the released lengths of the cords 26, 27, and 28 will permit. The telescoping arms 33 and 34 may be provided with suitable scales directly to indicate the space displacement of the airplane P from the antenna O and may cooperate with suitable scales mounted on the plotting board directly to indicate the azimuth and elevation of the airplane.

Fig. 7 represents a suitable mechanical arrangement for use with the plotting board of Fig. 5 to release required lengths of the cords 26, 27, and 28 in accordance with the indications provided by the respective indicating devices 21, 21', and 21''. In this arrangement, a shaft 37 is journalled in a support 38 and is provided on opposite ends with a worm gear 39 and a reel 40 about which one of the cords, for example, the cord 27, is wrapped to prevent slipping. The worm gear 39 engages a gear 41. Instead of calibrating the cords 26, 27, and 28 as in Fig. 5, the face of the gear 41 is calibrated, whereby the gearing 39, 41 may be manually adjusted in accordance with the reading of the indicator device 21' to release a specified length of the cord 27 corresponding to the space displacement of the airplane P from the pair of antennas O, B. While it has been stated that the gearing 39, 41 may be manually adjusted to release a selected length of the cord 27, it will be evident that an automatic arrangement can be provided in which the output voltage of the frequency detector 20' controls a motor to adjust the gearing 39, 41 until the correct amount of cord is reeled out.

From the above described operation of the Fig. 2 embodiment of the invention, a question may arise that an ambiguous indication of the space displacement of the airplane P from the antennas O, A, B, and C is obtained when the reflected carrier wave is received by one of the antennas A, B, or C after an interval longer than one-half of the period of the saw-tooth modulating signal developed by unit 12. Thus, referring to Fig. 8, curve D represents the frequency of the control signal as a function of the space displacement of the airplane P from one of the pairs of antennas, for example, the pair O, A. It will be seen from curve D that the frequency of the control signal increases to a maximum value corresponding to the space displacement $d$ but decreases for greater values of space displacement. The ambiguous indication which follows from displacements greater than $d$ may be avoided by increasing the period of the modulation signal derived by unit 12, as by reducing the rotational speed of the motor 13. In this event, the maximum frequency of the control signal derived by the detector 15 will correspond to a larger space displacement $d_1$ of the airplane P, as represented by curve E. It is, of course, desirable that the period of the modulation signal corresponding to the space displacement $d_1$ be a predetermined multiple, for example, ten times, that corresponding to the space displacement $d$ in order that the numerical calibration of the indicating devices 21, 21', and 21'' may be utilized for both modulation frequencies by employing a simple multiplying factor.

It will be evident that the space displacements of the airplane P from the pairs of antennas O, A, O, B, and O, C may become so small that the frequency of the control signals derived by one or more of the detectors 15, 15', and 15'' may be too small to provide an accurate indication. In this event, the period of the modulation signal generated by unit 12 may be decreased by increasing the rotational speed of the motor 13, whereby the control signal may have a maximum value corresponding to a much smaller space displacement $d_2$, as represented by curve F of Fig. 8. As before, it is preferable that the period of the modulation signal be reduced to one tenth its original value in order that the calibration of the indicating devices 21, 21', and 21'' can be read directly from the calibrated scales simply by moving the decimal point one place to the left.

Fig. 9 is a circuit diagram, partly schematic, of a complete system for determining the position of an object in space and embodies the invention in a modified form. This arrangement is essentially similar to the arrangement of Fig. 2, similar circuit elements being designated by similar reference numerals, except that the several indications provided by the pairs of antennas in the arrangement of Fig. 2 are combined in the present system to provide by means of a single indicating device the projected position of the airplane upon the earth. Such information may be desirable, for example, during military operations where a ground commander knows the altitude at which one of his airplanes is flying but wishes to determine and follow the flight of the airplane with respect to a fixed point on the ground.

In the arrangement of Fig. 9, the antennas A, B, C, and D are used as in Fig. 2 and an additional antenna E is provided, the pairs of antennas A—D and C—D being aligned and positioned on one of the axes of a rectangular system of Cartesian coordinates. Similarly, the pairs of antennas B—D and E—D are aligned and positioned on the other of the axes of the system of coordinates, the antenna D being positioned at the origin of the system of coordinates. The output of the frequency detector 20''' is applied to a voltage divider 43. The outputs of the frequency detectors 20, 20', 20'', and 20'''' are applied to the input circuits of a plurality of square-law direct current amplifiers 42, 42', 42'', and 42'''', respectively, each in series with a biasing voltage E, the value of which will presently be considered in greater detail, and one-half of the output of the frequency detector 20''' which is developed across the voltage divider 43 to derive four secondary-control potentials. The secondary-control potentials developed in the output circuits of the square-law amplifiers 42 and 42'', which correspond to the aligned pairs of antennas A—D and C—D, respectively, are differentially combined and applied to a pair of deflecting electrodes 44 and 45 of a cathode-ray tube 46. The secondary-control potentials developed in the output circuits of the square-law amplifiers 42' and 42'''', corresponding to the aligned pairs of antennas B—D and E—D, respectively, are similarly differentially combined and applied to a pair of deflecting electrodes 47 and 48 of the cathode-ray tube 46 normal to the electrodes 44, 45.

In considering the operation of the Fig. 9 arrangement, it will be evident that the projection of the position of the airplane P on the ground may be determined by a determination of the $x$ and $y$ coordinates of the airplane in the system of coordinates on the axes of which the antennas A, B, C and E are positioned. It can be shown mathematically that the $x$ and $y$ coordinates have the values:

$$x = \frac{A^2 - C^2}{4r} \tag{7}$$

$$y = \frac{B^2 - E^2}{4r} \tag{8}$$

where:

A, B, C and E = the space displacements of the airplane P from the respective antennas A, B, C and E, and $r$ = the space displacement of each of the antennas A, B, C and E from the antenna D.

It can also be shown mathematically that:

$$F_A = K(A+p-r) = K'E_A \tag{9}$$
$$F_B = K(B+p-r) = K'E_B \tag{10}$$
$$F_C = K(C+p-r) = K'E_C \tag{11}$$
$$F_E = K(E+p-r) = K'E_E \tag{12}$$
$$F_D = 2Kp = K'E_D \tag{13}$$

where:

$p$ = the space displacement of the airplane P from the antenna D

K and K' = arbitrary constants $E_A$, $E_B$, $E_C$, $E_D$ and $E_E$ = the voltage outputs of the respective frequency detectors 20–20'''', inclusive.

Substitution of Equations 9–13, in Equations 7 and 8, when simplified, give the following equations for the values of $x$ and $y$ coordinates:

$$4rx = K''\left(E_A + \frac{r}{k} - \frac{E_D}{2}\right)^2 - K''\left(E_C + \frac{r}{k} - \frac{E_D}{2}\right)^2 \quad (14)$$

$$4ry = K''\left(E_B + \frac{r}{k} - \frac{E_D}{2}\right)^2 - K''\left(E_E + \frac{r}{k} - \frac{E_D}{2}\right)^2 \quad (15)$$

where:

$$K'' = \left(\frac{K'}{K}\right)^2$$

$$k = \frac{K'}{K}$$

An inspection of Equation 14 would readily show that the output of the frequency detector 20 in Fig. 9 when added with proper sign to a small constant $$\left(\frac{r}{k}\right)$$

and to one-half the output of the frequency detector 20''' and amplified by the square-law amplifier 42 is equal to the first term of Equation 14, while the similar addition of the output of detector 20'' and the same constant $$\left(\frac{r}{k}\right)$$

and one-half that of detector 20''' when amplified by the amplifier 42'' is equal to the last term of Equation 14. Since the value of the constant term $$\frac{r}{k}$$

is the same in Equations 14 and 15, the constant term is provided by the battery E which has the voltage:

$$E_1 = \frac{r}{k} \quad (16)$$

When the battery E has this voltage, each of the vacuum tubes of the square-law amplifiers 42, 42', etc., are provided with a separate bias of conventional form having such value that the latter bias alone would normally just bias the square-law amplifier tubes to cut-off. Thus, when the outputs of the amplifiers 42 and 42'' are differentially combined and applied to the deflector electrodes 44 and 45 of the cathode-ray tube 46, the resultant deflection of the cathode-ray beam of tube 46 is a direct measure of the $x$ coordinate of the projected position of the airplane P on the ground. Similarly, the $y$ coordinate, as given by Equation 15, is obtained by differentially combining the outputs of the amplifiers 42' and 42'''' and by applying these outputs to the deflecting electrodes 47 and 48 of tube 46, the deflection of the cathode-ray beam in this direction providing a direct indication of the $y$ coordinate of the projected position of the airplane P on the ground. Consequently, the deflection of the cathode-ray beam by the deflecting electrodes 44–48, inclusive, varies in accordance with both the $x$ and $y$ coordinates and the point of impact of cathode-ray beam on the fluorescent screen of tube 46 indicates the projected position on the ground of the airplane P with respect to the antennas A–E, inclusive, the position to scale of the latter being shown on the screen of tube 46 if desired, as indicated on the drawings.

Thus, the antenna D derives a control signal, a characteristic of which varies with the space displacement of the airplane P from the antenna D. The output circuits of amplifiers 42, 42', 42'', and 42'''' comprise means for combining the amplified control signals in pairs corresponding to aligned pairs of antennas with a portion of the amplified potential derived by the additional antenna D to derive two secondary control signals which are individually applied to the pairs of deflecting electrodes 44, 45, and 47, 48 thereby to deflect the cathode ray of tube 46 in two directions normal to each other to indicate the position in space of the airplane P. As in the system of Fig. 2, the position of the airplane in space defines the point of intersection of surfaces of revolution which are characteristic of equal-valued control-signal loci of the pairs of antennas A, D, B, D, C, D, and E, D, and the position of the airplane can also be determined by this method, as described in connection with the explanation of the operation of the system of Fig. 2, from the indications provided by the indicating devices 21–21'''', inclusive.

The operations of the Fig. 2 and Fig. 9 arrangements, as above described, are premised upon the transmission of frequency-modulated carrier waves from a centrally-located radiating antenna O to the airplane P and the reflection of the carrier waves from the airplane to satellite receiving antennas. It will be evident that the reflected carrier waves have relatively weak intensity and the arrangements, when thus operated, are perhaps primarily useful in military operations to locate the position in space of hostile aircraft. The intensity of the reflected carrier waves may be increased by directing the radiated carrier waves only into the relatively small area of the sky occupied by the aircraft, as by the use of well-known reflector systems in conjunction with the radiating and receiving dipole antenna or by the use of other types of directional antennas.

The intensity of the carrier waves received by the satellite antennas may also be increased by retransmission to the satellite antennas of carrier waves received by the aircraft from the ground transmitter antenna. The circuit diagram of Fig. 10 shows an arrangement of this nature. The airplane P is provided with a source of local heterodyning oscillations comprising an oscillator 49 which is coupled to the input circuit of a modulator 50. An input circuit of the modulator 50 is also coupled to a dipole receiving antenna 51 which receives carrier waves radiated thereto from the antenna O of Fig. 2 or Fig. 9. The output circuit of the modulator 50 includes a switch 52 having a first pair of contacts 53 by which the modulator may be coupled directly to the input circuit of an amplifier 54 and having a second set of contacts 55 by which the modulator 50 may alternatively be coupled through a delay network 56 to the input circuit of the amplifier 54. The output circuit of amplifier 54 is coupled to a radiator antenna 57 of the dipole type.

In considering the operation of the Fig. 10 arrangement, it will be assumed that the switch 52 is moved to close its contacts 53, whereby the output of the modulator 50 is applied directly to the amplifier 54. The carrier wave received by antenna 51 and applied to the modulator 50 is heterodyned to a higher frequency by the oscillations applied to the modulator from oscillator 49. The heterodyned oscillations are amplified by amplifier 54 and are radiated by antenna 57 to the receiving antennas A, B, C, and D (Fig. 2, or A, B, C, D and E of Fig. 9) on the ground.

Referring to the curves of Fig. 11, curve A represents the carrier wave radiated directly from antenna O to antenna A, for example, and curve A' represents the carrier wave of higher frequency which is received from the airplane P by antenna A and applied to detector 15. The beat-frequency control signal derived in the output of detector 15 now has a frequency-deviation characteristic as represented by curve $a$, its frequency deviating equally above and below a mean-frequency represented by the axis $f_0$—$f_0$.

When the arrangement of Fig. 10 is used on the airplane P, the frequency detectors 20, 20', 20", etc., of the central station S preferably are provided with input frequency-selective networks having the frequency characteristic represented by curve $d$ of Fig. 12, the mean-resonant frequency $f_0$ of the network corresponding to the means frequency $f_0$, Fig. 11, of the control signal derived by detector 15. The control signal applied to the rectifier device of the detector 20 consequently has an amplitude characteristic as represented by curve $a'$ of Fig. 11. The output circuit of the detector 20 has a relatively shorter time constant than in the previous modifications of the invention, whereby the magnitude of the control potential derived in the output circuit of the detector 20 and applied to the indicating device 21 is directly proportional to the maximum frequency deviations of the control signal on either side of the mean-resonant frequency $f_0$.

The reradiated carrier wave received by another of the antennas, for example, the antenna B, may be that represented by broken-line curve B', Fig. 11, the time displacement of curve B' from curve A' indicating that the airplane P has a greater space displacement from the antenna B than from antenna A. The carrier wave radiated directly from antenna O to antenna B corresponds to curve A and there consequently is applied to the rectifier device of detector 15' a control signal having the frequency characteristic represented by the broken-line curve $b$. This control signal has a greater frequency deviation than that derived in the output of detector 15 but has the same mean frequency $f_0$—$f_0$. The signal voltage thus applied to rectifier device of the frequency detector 20' has the amplitude characteristic represented by broken-line curve $b'$ and the voltage derived in the output circuit of this detector and applied to the indicating device 21' is consequently larger than that derived by detector 20 and applied to the indicating device 21.

The control signal developed in the output circuit of detector 15" from the direct and reradiated carrier waves received by the antenna C will, in general, be similar to that of the control potentials developed for the antennas A and B and the unidirectional potential developed in the output circuit of the frequency detector 20" will, therefore, also have a different amplitude than the control potential developed in the output circuits of the frequency detectors 20 and 20'.

In the event that the airplane P of Fig. 10 approaches so close to the antennas A, B, and C that the indications provided by the indicating devices 21, 21', and 21" become too small for the required degree of accuracy, the switch 52, Fig. 10, may be operated to close its contacts 55 whereby the output circuit of the modulator 50 is coupled through the delay network 56 to the input circuit of the amplifier 54. The electrical delay network 56 provides an apparent space displacement of the airplane P from the antennas of the ground stations different from the actual space displacement therefrom. That is, the time required for the carrier wave from modulator 50 to travel through the delay network 56 to the input circuit of the amplifier 54 is equivalent in all respects to a delay caused by a larger space displacement of the airplane P from the antennas of the ground stations. As a result, the carrier wave received from the airplane by the antenna A, for example, may be that represented by curve B', Fig. 11, rather than that represented by curve A', as would be the case were the delay network 56 not used, whereby the unidirectional potential developed in the output of the frequency detector 20 now varies in accordance with the amplitude characteristic represented by curve $b'$ instead of that of curve $a'$. The indicating devices 21, 21', etc., are provided with a second calibration scale which is used when the delay network 56 is in circuit.

The use of the heterodyne oscillator 49 and modulator 50 in the arrangement of Fig. 10 has the advantage that feedback from the radiating antenna 57 to the receiving antenna 51 is avoided in large part. Their use also permits greater flexibility in the choice of operating constants of the system, such as the choice of the carrier-wave frequencies, the range of frequency deviation of the carrier waves, etc.

In place of receiving and reradiating the carrier wave transmitted to the airplane P from a ground station, as in the arrangements of Figs. 2, 9, and 10, the airplane P may itself carry the transmitting equipment comprising units 10–14, inclusive, of Fig. 2, whereby the carrier waves of periodically deviating frequency may be produced in the airplane P and radiated to the ground receiver stations. When this is done, the ground antenna system preferably takes the form of the arrangement represented by Fig. 13 which is essentially similar to the ground receiving system of Fig. 9. In the arrangement of Fig. 13, the carrier waves received by antenna D, located at the central station S, are applied to the input circuit of each of the detectors 15, 15', 15", and 15'''' whereas the carrier waves received by the antennas A, B, C and E are applied to the detectors individual thereto over the respective transmission lines 17, 17', 17" and 17'''' having equal finite length and thus equal delays to the carrier waves translated thereby. The frequency of the control signal developed by the detector 15, for example, of the pair of antennas A, D is now proportional to the difference, rather than the sum, of the space displacements of the airplane P from the antennas A and D. Since a hyperbola is the curve generated by a point moving so that the difference of its distances from two fixed points is always constant, it will be evident that the characteristic of the equal-valued control-signal loci for each of the pairs of antennas A, D, B, D, C, D, and E, D, are hyperbolic surfaces of revolution. Thus, in Fig. 14 the family of solid-line curves $d$–$n$, inclusive, represents the intersection of a horizontal plane and the hyperbolic surfaces of revolution which are characteristic of one pair of the antennas, for example, antennas A, D. Similarly, the family of broken-line curves $o$–$y$, inclusive, represent the intersection of the same plane and the hyperbolic surfaces of revolution which are characteristic of the pair of antennas C, D. The same system of curves apply to the aligned pairs of antennas B, D and E, D.

The position in space of the airplane P defines the point of intersection of surfaces of revolution of the four pairs of antennas A, D, B, D, C, D, and E, D. The point of intersection of surfaces of revolution of three pairs of antennas is sufficient to determine the position in space of the airplane P, but the fourth pair of antennas is useful to simplify a determination of the airplane's position by calculation. Where the position of the airplane is determined graphically, as by curves similar to those of Fig. 14, the method of procedure is much like that described in connection with Fig. 4a. That is, the readings of the indicating devices 21 and 21'' define a line of intersection of two of the hyperbolic surfaces of revolution, for example, those represented at curves k and w, respectively, and the indication provided by one of the indicating devices 21' or 21'''' will determine a point of intersection of a third hyperbolic surface of revolution on the line of intersection of the first two surfaces of revolution.

The position-determining system of the invention may also be used by a pilot in determining the position of his aircraft from a fixed point on the ground. Where this is done, each of the plurality of ground antennas radiates a frequency-modulated carrier wave to the airplane and the latter carries suitable receiving apparatus for receiving all of the carrier waves.

Fig. 15 represents the ground transmitter arrangement suitable for a position-determining system of this nature. The transmitter units 10–14, inclusive, are similar to the corresponding units of the transmitter station of Fig. 2. The output of amplifier 10 is applied directly to the dipole antenna O and to a commutator comprising a pair of rotating segments 58 and pairs of contacts 59–62, inclusive. Each of the pairs of contacts is coupled through respective ones of a plurality of units 63–66, inclusive, to respective ones of the antennas A, B, C, and E. The units 63–66, inclusive, are similar and preferably comprise a delay network. The use of delay networks provides an artificial space displacement of the antennas A, B, C, and E from the antenna O different from the actual space displacement therefrom. It will be understood that the units 63–66, inclusive, may be omitted, if desired. These units serve the same purpose as the unit 56 of the Fig. 10 arrangement previously described. It is preferably that two pairs of the aligned antennas, for example the pairs O, A and O, C, be positioned on a north-south axis and the other pairs be positioned on an east-west axis. In operation, the rotation of the commutator segments 58 consecutively to contact the pairs of contacts 59–62, inclusive, causes each of the pairs of antennas O, A, O, B, O, C, and O, E successively to radiate the frequency-modulated carrier wave produced by unit 10. The modulation signal is thus translated directly between the source of this signal, comprising the generator 12, and the airplane P by way of one antenna of each pair and indirectly between the source and the airplane P by way of the other antenna of each pair. By a prearranged system of operation, the order and interval of time during which antennas A, B, C and E are radiating is known to the operator of the airplane P. Furthermore, an identification code may be transmitted to indicate that the radiation is from predetermined ones of the antennas.

Fig. 16 represents a receiving apparatus carried by the airplane which is suitable for use with the transmitting arrangement of Fig. 15. This apparatus includes a detector 67 having its input circuit coupled to a dipole receiving antenna G. There is coupled to the output circuit of detector 67, in the order named, an amplifier 68, a limiter system 69, a frequency detector 70, and an indicating device 71. The units 67–71, inclusive, correspond to the respective units 15, 16, 19, 20, and 21 of the Fig. 2 arrangement.

Since the frequency of the control signal developed in the output of the detector 67 varies with the difference of the space displacements of the antenna G from individual ones of the antennas O, A, B, C, and E of the ground transmitting station, it will be evident that the equal-valued control-signal loci characteristic of the pairs of antennas O, A, O, B, O, C, and O, E are represented by hyperbolic surfaces of revolution. The indications provided by the indicating device 71 for each of the pairs of antennas O, A, O, B, O, C, and O, E may thus be used with a system of curves of the type illustrated in Fig. 14 graphically to determine the point of intersection of at least three hyperbolic surfaces of revolution common to the position of the airplane P in space, thereby to determine the position of the airplane from the ground transmitting antennas.

In the foregoing description of the use of curves of Fig. 14 graphically to determine the position of the airplane P in space, it will be noted that the method of energizing the antennas from the source of carrier waves was such that the beat frequency control signal was derived from a first modulation signal which was translated directly by one antenna of each pair and a second modulation signal which was translated indirectly by the other antenna of each pair over the space path separating the one and the other antennas. This method of energizing the antennas has the advantage that the limiting curves A, M and A, N correspond, respectively, to the minimum and maximum frequencies of the derived beat frequency control signal and the curves d—n correspond to successively smaller individual intermediate values of control signal frequency. Likewise, the limiting curves C, N and C, M correspond, respectively, to the minimum and maximum frequencies of the control signal derived for the pair of antennas C, D and the curves o—y correspond to successively larger individual intermediate values of control signal frequency.

The units 63'—66', inclusive, of Figs. 15a–15d, inclusive, comprise heterodyne oscillator-modulators, which may be substituted for the delay networks 63–66, inclusive, of Fig. 15. The use of such oscillator-modulators permits the frequency of the carrier wave developed by unit 10 to be increased prior to radiation by the antennas A, B, C, and E. In this case, a new mode of operation is possible in which all of the antennas radiate simultaneously. The airplane in this event is equipped with a plurality of beat-frequency control-signal channels, one for each of the pairs of radiating antennas of the ground station. An additional control-signal channel of this nature is indicated in Fig. 16 in broken lines as comprising units 68'–71', inclusive, which are similar to units 68–71, inclusive. The additional channels, of course, are all coupled to the output circuit of the detector 67 as indicated. The heterodyne oscillators of units 63'–66', inclusive, have different frequencies in order that the carrier waves radiated by any one of the antennas A, B, C, and E may have a mean frequency different from that of the other antennas. Thus, units 63'–66', inclusive, comprise means for generating a plurality of high-frequency carrier waves having related frequencies. This permits dispensing with the commutator comprising the segments 58 and the pairs of contacts 59–62, inclusive, the input circuits of units 63'–66', inclusive, being connected directly to the output circuit of unit 10, whereby the antennas A, B, C, and E simultaneously radiate carrier waves of different mean frequencies. Where this is done, the control signals derived by the detector 67 for each of the pairs of antennas of the ground station will have different mean frequencies and the individual control-signal channels 68–71, inclusive, 68'–71', inclusive, etc., are tuned to the mean frequencies of individual ones of the control signals. The plurality of indicating devices 71, 71', etc., of the receiving apparatus carried by the airplane thus continuously indicate the relative distances of the airplane from the antennas of each of the pairs of antennas of the ground station.

The position-indicating system of the type exemplified by the arrangements of Figs. 15, 15a–15d, inclusive, and 16 may be adapted to provide automatic steering of the airplane along a predetermined desired course. Fig. 17 represents a modification of a portion of the receiving apparatus of Fig. 16 which is suitable for this purpose, similar circuit elements being designated by the same reference numerals. The output circuit of the limiter system 69 is coupled to the input circuit of a double-balanced modulator 72 which may, for example, be of the type shown in Fig. 2, page 447, of the October 1940 issue of the Proceedings of the Institute of Radio Engineers. A source of oscillations 73 of variable frequency is also coupled to the input circuit of the modulator 72. The output circuits of unit 72 are coupled to a split-phase type of induction motor 74 which is mechanically connected through suitable gearing 75 to the rudder 76 of the airplane.

Considering now the operation of the Fig. 17 arrangement, and referring to Fig. 18 which represents the intersection of a horizontal plane and the hyperbolic surfaces of revolution characteristic of one pair of antennas, for example, the pair O, A, of the ground station, assume that it is desired that the airplane P shall automatically fly along a course from point $x$ to point $y$. This course lies along the surface of revolution corresponding to one value of maximum or mean frequency of the control signal, depending upon whether units 63–66, inclusive, Fig. 15 or units 63'–66', inclusive, Figs. 15a–15d, of the ground station comprise, respectively, delay networks or heterodyne oscillator-modulators, for example, a frequency corresponding to 1,000 cycles. The oscillator 73 is adjusted to generate oscillations of the same frequency, in the example assumed 1,000 cycles. The control signal thus applied to the double-balanced modulator 72 has a frequency corresponding to that of the oscillator 73 and no effective control potential is developed in the output of modulator 72. However, should the airplane P deviate off the course $x, y$, the frequency of the control signal applied to the modulator 72 correspondingly changes. The modulator 72 thereupon produces an effective control potential which is applied to the motor 74. The latter responds to the control potential to operate the rudder 76 in a direction to return the airplane P to the course $x, y$. Assume that when the airplane reaches the point $y$ it is desired that the airplane shall follow another course, as that along the line $z, z'$. The frequency of the oscillator 73 is suitably changed to produce an output from modulator 72 to cause the rudder 76 to move in a direction such that the airplane is directed from the point $y$ toward the course $z, z'$. When the new course is reached, the frequency of the control signal has changed sufficiently that the effective output of the balanced modulator becomes zero. The airplane P will thereafter automatically follow along the course $z, z'$ in the same manner that it followed the course $x, y$ prior to the change in frequency of oscillator 73.

Thus, units 72, 73 and elements 74, 75 and 76 comprise means carried by the airplane P and responsive to the control signal for navigating the airplane P along a predetermined course corresponding to the intersection of a selected one of the surfaces of revolution characteristic of the pair of antennas O, A and a desired plane.

The directed navigation of an object along the surface of the ground or water or at a given elevation may likewise be controlled at a ground transmitting station. An arrangement of this type is shown in Fig. 19 wherein a pair of radiating antennas M, N are positioned at opposite ends of a boat 77. A torpedo 78 includes a receiving apparatus of the type shown in Figs. 16 and 17 whereby it is responsive to carrier waves radiated by antennas M and N to follow a selected one of curves $r, s$, or $t$ which represent the intersection of a horizontal plane and the hyperbolic surfaces of revolution characteristic of the pair of antennas M, N. A control device 79 is effective to vary the values of the system of equal-valued control-signal loci surfaces of revolution.

In using the arrangement of Fig. 19, a plot of the equal-valued control-signal loci characteristic of the antennas M, N will have been made beforehand and it will be known that a particular curve of such plot corresponds to a control signal of a given frequency, for example, that curve $t$ corresponds to a control signal of 1000 cycles, while other curves in successive order correspond to control signals having equal increments of increasing frequency, for example, that curves $s$ and $r$, respectively, correspond to control signals of 1200 and 1400 cycles, for a given setting of the control device 79. Adjustment of the control device 79 has the effect that the curves of such plot are simply renumbered; that is, the device 79 may be so adjusted that curve $t$, in the example assumed, corresponds to a control signal of 800 cycles, curve $s$ a control signal of 1000 cycles and curve $r$ of 1200 cycles. The space displacement of a target 80 from the boat 77 and the path of its travel with respect thereto may be determined by ordinary methods of triangulation and its displacement and path of travel is then charted to scale on the characteristic plot for the pair of antennas M, N. Assuming this to have been done and that a torpedo is initially launched to follow the curve $t$, which may for example represent the locus of points of a control signal having a frequency of 1000 cycles, toward the target 80, the control 79 may be adjusted as the target 80 successively intersects the curves $s$ and $r$ at positions $b$ and $c$ to make the latter curves in turn correspond to the same control-signal frequency, the value of 1000 cycles in the example assumed. Consequently, the target 80 in moving from positions $a$ to $b$ to $c$ always intersects a curve corresponding to a control signal of given frequency whereby the torpedo 78, though perhaps not always visible from the boat 77, is automatically steered from the boat to follow the target 80 into impacting relation therewith.

In the foregoing description of the invention, it was stated that the modulation signal preferably frequency modulates the carrier wave radiated by one or more of the antennas. Essentially, however, the control signal derived for each of the pairs of antennas has a value dependent upon the relative phases of the modulation signals which are transmitted over two paths, one of which corresponds to the space displacement of the airplane P from individual antennas of each pair and the other of which corresponds to the space displacements of the antennas of each pair from each other. From this it will be evident that the carrier signal may alternatively be amplitude-modulated by the modulation signal and, further, that the modulation signal may have other wave forms, for example, a periodic rectangular pulse wave form, whether the carrier wave be frequency-modulated or amplitude-modulated.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means including said antennas for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

2. A system for determining the position in space of an object comprising, a plurality of related antennas having space displacements with respect to each other and to said object, said antennas forming at least three pairs, a source of high-frequency carrier waves, means for generating a modulation signal for periodically deviating the frequency of said carrier wave at a substantially constant rate over a predetermined range of frequency deviation, means including said antennas for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

3. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means including said antennas for translating said modulation signal over paths corresponding to each of said space displacements, means responsive to signals translated over said paths to derive for each of said pairs of antennas a control signal the magnitude of which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

4. A system for determining the position in space of an object comprising, a plurality of related antennas having space displacements with respect to each other and to said object, said antennas forming at least three pairs, a source of high-frequency carrier waves, means for generating a modulation signal for periodically deviating the frequency of said carrier wave at a substantially constant rate over a predetermined range of frequency deviation, means including said antennas for translating said modulation signal over paths corresponding to each of said space displacements, means responsive to signals translated over said paths to derive for each of said pairs of antennas a beat-frequency control signal the frequency of which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

5. A system for determining the position in space of an object comprising, a plurality of related antennas having space displacement with respect to each other and to said object, said antennas forming at least three pairs, a source of high-frequency carrier waves, means for generating a linear saw-tooth modulation signal for periodically deviating the frequency of said carrier wave at a substantially constant rate over a predetermined range of frequency deviation, means including said antennas for translating said modulation signal over paths corresponding to each of said space displacements, means responsive to signals translated over said paths to derive for each of said pairs of antennas a beat-note control signal having a substantially constant frequency of value dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

6. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means including said antennas for translating said modulation signal over paths corresponding to each of said space displacements, means for combining said translated signals to derive for each of said pairs of antennas a control signal having a characteristic which is dependent upon the relative space displacement of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

7. A system for determining the position in space of an object comprising, a plurality of related antennas having space displacements with respect to each other and to said object, said antennas forming at least three pairs, a source of high-frequency carrier waves, means for generating a modulation signal of saw-tooth wave form for periodically varying a characteristic of said carrier waves, means including said antennas for translating said modulation signal over paths corresponding to each of said space displacements, means responsive to signals translated over said paths to derive for each of said pairs of antennas a control signal having a characteristic which is dependent upon the phase of the saw-tooth wave forms of said signals translated by the antennas of such pair and thus upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

8. A system for determining the position in space of an object comprising, a plurality of related antennas having space displacements with respect to each other and to said object, said antennas forming at least three pairs, a source of high-frequency carrier waves, means for generating a modulation signal for periodically deviating the frequency of said carrier wave at a substantially constant rate over a predetermined range of frequency deviation, means including said antennas for translating said modulation signal over paths corresponding to each of said space displacements, means responsive to signals translated over said paths to derive for each of said pairs of antennas a beat-frequency control signal having a frequency characteristic which is dependent upon the relative space displacements of said object from individual ones of said antennas, a plurality of frequency detectors, means for individually applying said control signals to said detectors to derive for each of said pairs of antennas a control potential the magnitude of which is dependent upon the relative magnitudes of the space displacement of said object from individual ones of said antennas, each of said pairs of antennas having the characteristic that its equal-valued control-potential loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

9. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means including said antennas for translating carrier waves from said source over paths corresponding to each of said space displacements, means responsive to carrier waves translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

10. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means for translating directly between said object and the antennas of said pairs carrier waves corresponding substantially to said modulated-carrier waves, means responsive to the signals translated by the antennas of each of said pairs to derive for each of said pairs a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

11. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means including said antennas for translating said modulation signal over paths corresponding to each of said space displacements, means responsive to signals translated directly by one antenna of each pair and to signals translated indirectly by the other antenna of each pair over the space path separating said one and said other antennas to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

12. A system for determining the position in space of an object comprising, a plurality of space-displaced antennas forming at least three pairs, a source of high-frequency carrier waves, means for generating a modulation signal for periodically varying a characteristic of said carrier waves, means for translating said signal both directly between said source and said object by way of one antenna of each of said pairs and indirectly between said source and said object by way of the other antenna of each of said pairs, means for combining said translated signals to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

13. A system for determining the position in space of a carrier-wave reflecting object comprising, a plurality of space-displaced antennas forming at least three pairs including one antenna common to each, a source of high-frequency carrier waves, means for generating a modulation signal for periodically varying a characteristic of said carrier waves, means for translating said modulation signal from said source directly to each of said antennas and indirectly to the uncommon antennas of said pairs by reflection from said object, means for combining said translated signals to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

14. A system for determining the position in space of an object comprising, at least three related antennas displaced on the axes of a system of Cartesian coordinates and spaced equidistant from the center thereof, a fourth antenna positioned at the center of said system of coordinates and forming in common with each of said first-named antennas three pairs of antennas, said antennas having a space displacement with respect to said object, a source of high-frequency carrier waves, means for generating a modulation signal for periodically varying a characteristic of said carrier waves, means including said antennas for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

15. A system for determining the position in space of an object comprising, a plurality of related antennas having space displacements with respect to each other and to said object, said antennas forming at least three pairs, a source of high-frequency carrier waves carried by said object, means carried by said object for generating a modulation signal for periodically varying a characteristic of said carrier waves, means including said antennas for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

16. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means for transmitting said modulation signal from all of said antennas to said object, means carried by said object and responsive to signals translated from said antennas to derive for each of said pairs of antennas a control signal having a characteristic which is dependent upon the relative space displacements of said object from individual ones of said antennas, each of said pairs of antennas having the characteristic that its equal-valued control signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

17. A system for determining the position in space of an object comprising, a plurality of related antennas having space displacements with respect to each other and to said object, said antennas forming at least three pairs, means for generating a plurality of high-frequency carrier waves having related frequencies, means for generating a modulation signal for periodically and simultaneously varying a characteristic of said carrier waves, means including individual ones of said antennas for simultaneously translating said carrier waves over paths corresponding to the individual displacements of said antennas from said object, means responsive to signals translated by said antennas to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

18. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, electrical means for providing an apparent space displacement of said antennas different from said actual space displacement, means including said antennas and said electrical means for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

19. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, electrical delay network means for providing an apparent space displacement of said antennas different from said actual space displacement, means including said antennas and said delay network means for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

20. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, heterodyne oscillator means for providing an apparent space displacement different from said actual space displacement, means including said antennas and said heterodyne oscillator means for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

21. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, electrical means for providing an apparent space displacement of said object from at least one pair of said antennas different from the actual space displacement of said object therefrom, means including said antennas and said electrical means for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

22. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, an electrical delay network for each of said pairs of antennas for providing an apparent space displacement between the antennas of each pair different from the actual space displacement therebetween, means including said antennas and said delay networks for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to determine said point of intersection, thereby to determine the position in space of said object.

23. A system for determining the position in space of an object comprising, a plurality of related antennas having space displacements with respect to each other and to said object, said antennas forming at least three pairs, a source of high-frequency carrier waves, means for generating a modulation signal for periodically varying a characteristic of said carrier waves, means including said antennas for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, and means for utilizing said control signals to provide a visual indication representative of the position in space of said object.

24. A system for determining the position in space of an object comprising, a plurality of related antennas having space displacements with respect to each other and to said object, said antennas forming at least three pairs and being positioned on the axes of a system of Cartesian coordinates, a source of high-frequency carrier waves, means for generating a modulation signal for periodically varying a characteristic of said carrier waves, means including said antennas for translating said modulation signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, means for combining the control signals corresponding to aligned pairs of said antennas to develop secondary control signals, and means responsive to said secondary control signals for providing a visual indication representative of the position in space of said object.

25. A system for determining the position in space of an object comprising, a plurality of related antennas having space displacements with respect to each other and to said object, said antennas forming at least three pairs and being positioned on the axes of a system of Cartesian coordinates, a source of high-frequency carrier waves, means for generating a modulation signal for periodically varying a characteristic of said carrier waves, means including said antennas for translating said modulation signal over paths corresponding to each of said space displacements, means responsive to the signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of at least three of said pairs of antennas, means for combining the control signals corresponding to the antennas of each of said pairs to develop secondary control signals representative of the two coordinates of the projected position of said object on the ground, and cathode-ray tube indicating means responsive to said secondary control signals for reproducing a visual indication corresponding to said two coordinates.

26. A system for determining the position in space of an object comprising, a plurality of related antennas having space displacements with respect to each other and to said object, said antennas forming four pairs and being positioned on the axes of a system of Cartesian coordinates with one antenna of each pair being located at the center of said system and the other antennas being symmetrically spaced equidistant therefrom, a source of high-frequency carrier waves, means for generating a modulation signal for periodically varying a characteristic of said carrier waves, means including said antennas for translating said modulating signal over paths corresponding to each of said space displacements, means responsive to signals translated over said paths to derive for each of said pairs of antennas a control signal having a characteristic which is dependent upon the relative space displacements of said object from individual ones of said antennas, each of said pairs of antennas having the characteristic that its equal-valued control-signal loci are represented by geometric surfaces of revolution, the position in space of said object defining the point of intersection of surfaces of revolution of said four pairs of antennas, a cathode-ray tube, means including an additional antenna centrally positioned with respect to said pairs of antennas for deriving a control signal a characteristic of which varies with the space displacement of said object from said additional antenna, means for deriving a control potential from each of said control signals, amplifying means having a square-law input-output characteristic for differentially combining one-half of the derived control potential corresponding to said additional antenna with each of the other said derived control potentials and for amplifying said combined control potentials to derive four secondary control potentials, means for differentially combining said secondary control potentials in pairs corresponding to aligned pairs of antennas to derive two secondary-control signals and for applying said secondary-control signals to said cathode-ray tube to deflect the cathode-ray thereof in two directions normal to each other to produce an indication representative of the position in space of said object.

27. A system for determining the position in space of a navigable object comprising, a pair of antennas displaced with respect to each other and to said object, a source of high-frequency carrier waves, means for generating a modulation signal for periodically varying a characteristic of said carrier waves, means for translating said signal directly between said source and said object by way of each of said antennas, means carried by said object for combining said translated signals to derive a control signal having a characteristic which is dependent upon the relative space displacements of said object from individual ones of said antennas, said antennas having the characteristic that their equal-valued control-signal loci are represented by geometric surfaces of revolution, and means carried by said object and responsive to said control signal for navigating said object along a predetermined course corresponding to the intersection of a selected one of said surfaces of revolution and a desired plane.

28. A system for determining the position in space of a navigable object comprising, a pair of antennas displaced with respect to each other and to said object, a source of high-frequency carrier waves, means for generating a modulation signal for periodically varying a characteristic of said carrier waves, means for translating said signal directly between said source and said object by way of each of said antennas, means for artificially effecting an apparent space displacement of one of said antennas from said object different from the actual space displacement therefrom, means carried by said object for combining said translated signals to derive a control signal having a characteristic which is dependent upon the relative effective space displacements of said object from individual ones of said antennas, said antennas having the characteristic that their equal-valued control-signal loci are represented by geometric surfaces of revolution, and means carried by said object and responsive to said control signal for navigating said object along a predetermined course corresponding to the intersection of a selected one of said surfaces of revolution and a desired plane.

HAROLD M. LEWIS.